Patented Oct. 15, 1935

2,017,355

UNITED STATES PATENT OFFICE 2,017,355

VINYL ETHER

Walter Reppe and Werner Wolff, Ludwigshafen-on-the-Rhine, Germany, assignors to I. G. Farbenindustrie Aktiengesellschaft, Frankfort-on-the-Main, Germany No Drawing. Application December 8, 1934, Serial No. 756,705. In Germany December 20, 1933

3 Claims. (Cl. 260—150)

The present invention relates to vinyl ethers and a process of producing same.

It has already been proposed to lead acetylene with organic compounds containing hydroxyl or carboxyl groups over heated catalysts for the purpose of preparing esters or ethers of ethylideneglycol and vinyl alcohol. The catalysts employed for the said reaction comprise inter alia compounds of cadmium and zinc, as for example cadmium acetate. While it is possible to prepare vinyl acetate according to the said process by reacting acetylene with acetic acid without any great difficulty, when aliphatic alcohols are caused to react with acetylene there is formed instead of the vinyl ether the corresponding acetal by further reaction of alcohol with the vinyl ether.

Contrary to expectation we have now found that mononuclear isocyclic monohydroxy compounds, in particular the phenols, can be smoothly converted into the corresponding vinyl ethers by leading them in the vapor phase together with acetylene over heated zinc or cadmium salts of organic acids which are preferably precipitated on substances having large surfaces, as for example active carbon or pumice stone. Atmospheric pressure is preferably used in this reaction, but increased pressures up to about 20 atmospheres may also be employed without injurious effect; when starting with high boiling monohydroxy compounds, reduced pressure is advantageous. Dilution of the reaction mixture with inert gases or vapors is unnecessary.

The following example will further illustrate how the said invention may be carried out in practice but the invention is not restricted to this example.

Example

A mixture of phenol vapor and acetylene in the ratio by volume of 2:1 is led at atmospheric pressure and at a speed of 50 liters per hour per liter of catalyst through a tube heated to 270° C. and charged with active carbon upon which has been precipitated zinc acetate. In addition to unchanged phenol, 20 grams of vinyl phenyl ether per hour per liter of catalyst are obtained. The unconverted phenol is supplied again to the reaction tube.

Instead of zinc acetate, cadmium acetate precipitated on pumice stone or another suitable carrier, may be employed with equal result.

In analogous manner vinyl tolyl ethers may be obtained from cresols, vinyl xylyl ethers from xylenols, vinyl cyclohexyl ether from cyclohexanol and vinyl benzyl ether from benzyl alcohol.

What we claim is:—

1. The process of producing vinyl ethers which comprises leading mononuclear isocyclic monohydroxy compounds in the vapor phase together with acetylene over a catalyst selected from the group consisting of zinc and cadmium salts of organic acids.

2. The process of producing vinyl ethers which comprises leading mononuclear isocyclic monohydroxy compounds in the vapor phase together with acetylene over a catalyst selected from the group consisting of zinc and cadmium salts of organic acids under superatmospheric pressure.

3. The process of producing vinyl phenyl ether which comprises leading gaseous phenol together with acetylene over a catalyst selected from the group consisting of zinc and cadmium salts of organic acids.

WALTER REPPE.
WERNER WOLFF.